Oct. 15, 1968   HANNS-DIETER PASCHKE   3,405,692
SUPERCHARGED ROTARY INTERNAL COMBUSTION ENGINE
Filed July 15, 1966   6 Sheets-Sheet 1

INVENTOR.
HANNS-DIETER PASCHKE
BY Raymond P. Wallace
AGENT

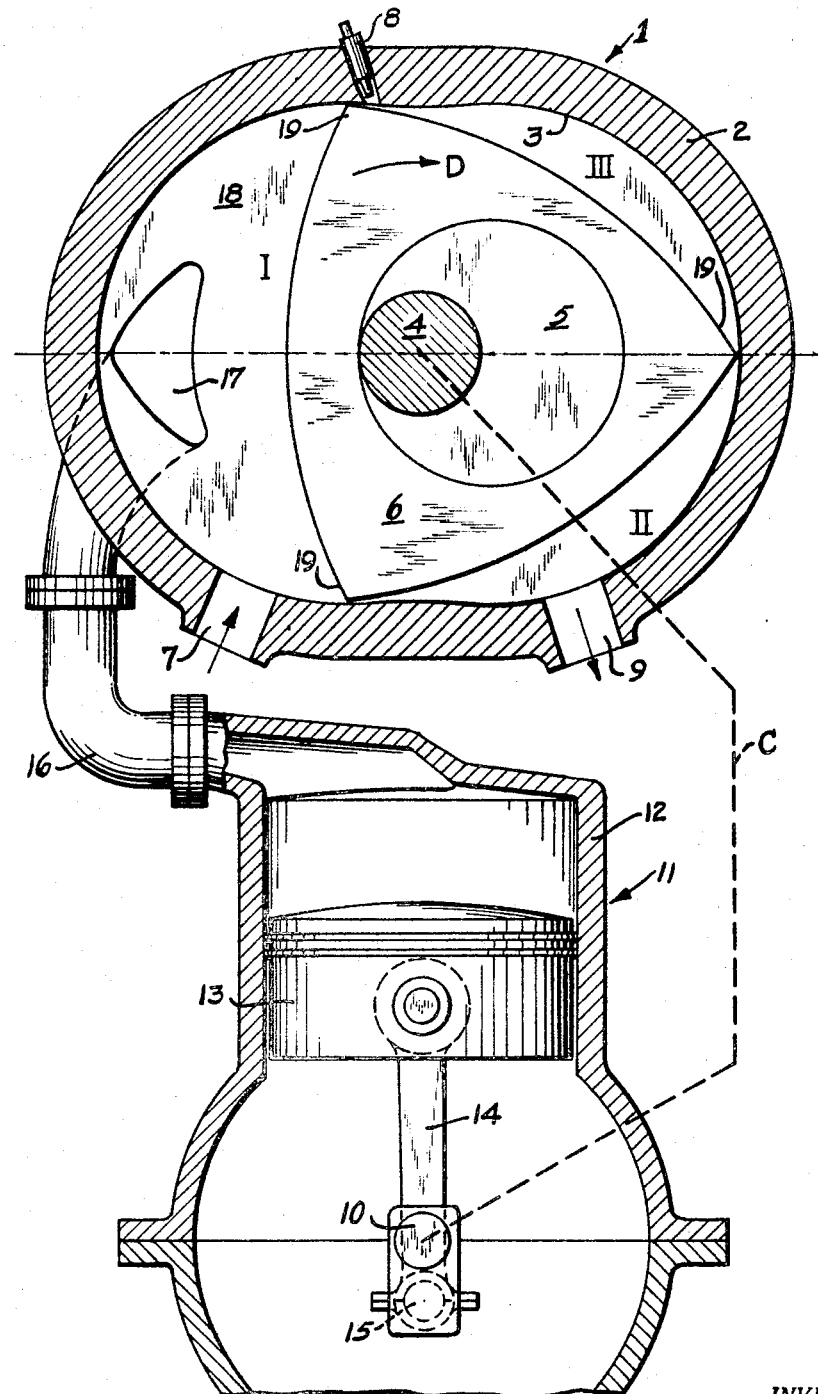

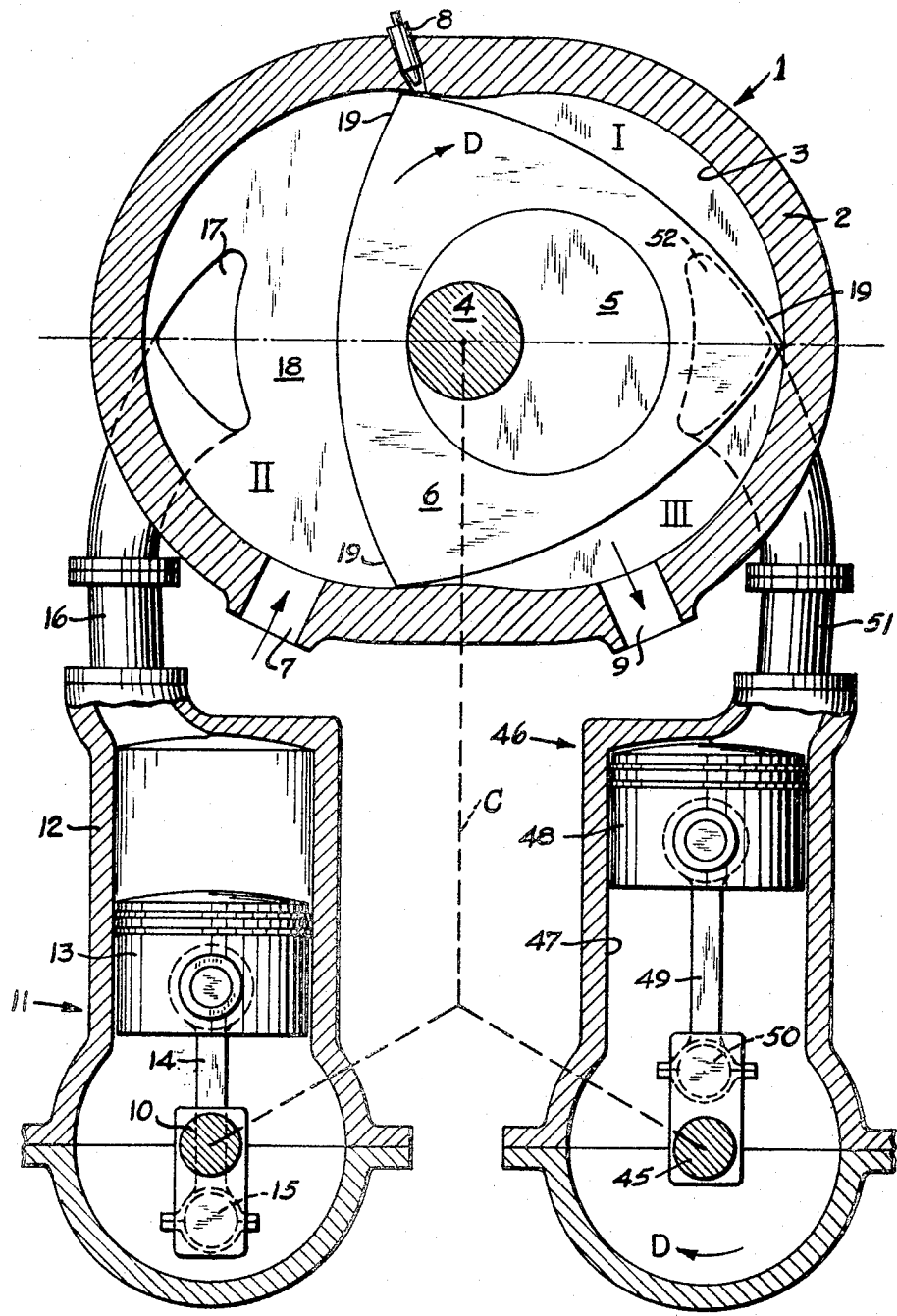

3,405,692
SUPERCHARGED ROTARY INTERNAL COMBUSTION ENGINE

Hanns-Dieter Paschke, Neckarsulm, Germany, assignor to NSU Motorenwerke Aktiengesellschaft, Neckarsulm, and Wankel G.m.b.H., Landau (Bodensee), Germany
Filed July 15, 1966, Ser. No. 565,511
Claims priority, application Germany, July 31, 1965, N 27,114
16 Claims. (Cl. 123—8)

ABSTRACT OF THE DISCLOSURE

A trochoidal rotary engine in combination with a supercharging device which intakes an air charge through the primary engine and refluxes it back thereto.

---

This invention relates to rotary internal combustion engines of the epitrochoidal type, and more particularly to such engines in combination with supercharging systems and suitable for diesel operation, and to such engines in combination with a secondary fluid machine operated by post-expansion of combustion gases from the primary engine.

In rotary engines of the prior art, having a two-lobed epitrochoidal housing and a generally triangular rotor, use of the diesel process has involved certain difficulty. This arises from the fact that in order to achieve the high compression requisite for the diesel process the epitrochoid must have relatively low cusps in the waist section, that is, it must be more nearly oval in shape than the epitrochoids designed for spark ignition. This results in a great structural size for a given chamber volume, large chamber surface at the instant of ignition, and an elongated crescent-shaped combustion chamber that can be served only imperfectly by a single injection nozzle. Further, the drive shaft is relatively weak because its diameter is limited by the gearing arrangement which keeps the rotor in phase.

For these reasons, attempts have been made to construct diesel-type engines having a narrower-waisted configuration approximating that of Otto-type epitrochoidal engines, the high compression ratio needed for spontaneous ignition of the fuel being attained by attaching a separate supercharging device. In this case the total quantity of air used by the engine is precompressed in the supercharger to such an extent that the necessary high compression ratio will then be reached during the subsequent compression in the engine. This scheme has the drawback that the supercharger must be of large dimensions, and during transfer of the compressed air charge to the induction chamber of the engine substantial throttling losses result.

This invention has the primary object of providing a four-cycle diesel engine of the epitrochoidal type, wherein the epitrochoidal inner surface of the rotor housing has approximately the same configuration as a comparable engine of Otto-type, thus maintaining a more favorable combustion chamber shape. The necessary compression ratio is achieved by combination with a supercharging device, in such a manner that in effect the volume of the induction chamber of the engine is substantially enlarged without altering the engine geometry and without altering the volume of the combustion chamber. The combination of the invention allows the use of a much smaller supercharger than in the prior art, with much lower losses during the transfer of the air mass.

These advantages are attained by coupling to the drive shaft of the engine a supercharger of either reciprocating piston or rotary piston type, in such a manner that the supercharging device intakes air from a transfer channel opening into the induction chamber of the engine during the time when the engine intake port is open, and then transfers the charge back to the same chamber through the same channel after the intake port has closed, after which the charge is compressed in the manner normal to such engines. Thus, the total charge of air comprises the volume of the engine intake chamber and the volume of the supercharger chamber, which total volume is then compressed in an engine combustion chamber of normal size.

The supercharger therefore does not handle the entire mass of air, but only the additional quantity needed for reaching the required high compression, and the supercharger can be kept correspondingly small. Further, because the compression spaces of the engine and the supercharger are in communication during the time when both machines are compressing, flow losses are very small..

The displacement supercharger is preferably coupled to the drive shaft of a two-lobed epitrochoidal engine in such a way that during turning of the engine drive shaft through 360° the supercharger performs one induction cycle and one compression cycle. The compression cycle of the supercharger thus extends 180°, whereas in the case of the epitrochoidal engine the compression cycle extends 270° of shaft rotation. When the engine and supercharger are coupled together in such a way that the two compression cycles begin at the same instant, then the compression cycle of the supercharger, and thus the air transfer, is ended 90° angle of revolution of the drive shaft before the end of the compression cycle of the engine. Therefore, the air charge sucked into the engine chamber itself and the charge previously forced over to it by the supercharger are during this 90° compressed together in the compression chamber of the engine.

Because flow loss depends on pressure in the compression chamber of the engine during air transfer, it may in some cases be advantageous to couple the supercharger to the engine shaft in such a way that supercharger compression begins before the compression cycle of the engine. With this arrangement the transfer would end not 90°, but for example 120°, before the end of the compression cycle of the engine chamber, the pressure in the engine compression chamber therefore being correspondingly lower during transfer.

Control of the transfer channel can be obtained in various ways. For example, it is possible to position in the transfer conduit a check valve that obturates the conduit when the pressure in the supercharger chamber is less than in the compression chamber of the engine, which is the case when the supercharger has passed upper dead center and begins to intake again. Another method, which is illustrated in the drawings of the present invention, is to control the transfer channel by disposing its orifice in an end wall of the epitrochodal housing such that the orifice is overrun by the rotor after the compression cycle of the supercharger ends.

For the displacement supercharger use can be made of a reciprocating piston and cylinder whose shaft can be coupled directly to the engine shaft, since the supercharger's compression cycle extends through 180° of rotation of its shaft. It is also possible to make use of a rotary piston machine of single-lobed epitrochoidal construction, with a 1:2 transmission ratio between its shaft and rotor.

Within the scope of the invention it is also possible to supply a plurality of engines with air from a single supercharger. If n identical rotary combustion engine units are provided, with their rotors disposed on a common drive shaft, the supercharger is coupled to the common engine shaft in such a way that during 360° angular rotation of the engine shaft the supercharger makes n induction and compression cycles, with the compression chamber of the supercharger in communication with the operative chambers of the engine units by means of appropriate flow channels and valving, during the period of time in which both the supercharger and the engine unit concerned are compressing, with the supercharger compression cycle ending in each case before the end of compression in the associated engine unit.

Analogously, a similar fluid machine may be coupled to the rotary engine on its expansion side to boost the total power output, either to drive the supercharger or for other purposes.

For the purpose of supplying the power needed to drive the supercharger there is normally provided a secondary-expansion engine, for example a waste-gas turbine. The burned gases, after expansion in the primary rotary engine, are conducted to the expansion engine for further expansion. In the present invention, for the purpose not only of meeting the power requirement of the supercharger but also for increasing the efficiency of the engine, there is provided an expansion engine coupled to the shaft of the rotary engine. The expansion chamber of the secondary engine is in communication by a transfer channel with an expanding chamber of the rotary engine during the period when there is expansion in both machines, but with expansion in the primary engine beginning before the start of the expansion cycle in the secondary engine.

The burned gases expand for some time only in the primary rotary engine, then the transfer channel opens and continuing expansion takes place in both machines. Here once more, it is advantageous to couple the expansion engine to the shaft of the primary engine in such a way that during a 360° angular rotation of the shaft one expansion cycle and one exhaust cycle in the secondary machine will occur. Thus, the expansion cycle of the secondary engine extends over 180° of shaft rotation and that of the primary engine extends over 270°, so that transfer begins 90° after the beginning of the expansion cycle in the primary engine, and the expansion cycle of both machines ends at the same instant.

After 90° of shaft rotation the expansion of burned gases in the primary engine is already considerably advanced, and the temperature of the gases has dropped substantially. Some power improvement in this respect can be achieved by coupling the expansion engine to the primary engine shaft in such a way that the expansion cycle of the secondary engine begins later and also ends later than that of the primary engine, so that the temperature and pressure of gases are lower during transfer.

Valving of the transfer channel may be done analogously to the valving of the transfer channel of the supercharger, with the rotor of the primary engine overrunning the orifice of the gas-transfer channel in such a way that it opens at the proper time, and closes at the latest by the end of the exhaust phase of the primary engine.

For the secondary or expansion engine use can be made of a reciprocating piston directly coupled to the shaft, or a single-lobed epitrochoidal machine having two working chambers. It is also apparent that the expansion engine may be a device having more than one expansion and exhaust cycle per revolution of the main drive shaft, for supplying a primary engine having a plurality of units.

Further according to the invention, it is possible to combine the supercharger and the expansion engine into a single machine. Suitable for this is, for example, an epitrochoidal engine of one lobe forming two working chambers, in which one chamber is used to produce the supplementary compressed air, and the other chamber is used for expansion of burned gas from the primary engine.

When such a single-lobed epitrochoidal machine having two working chambers is used as a supercharger or as an expansion engine for only one primary engine, it may be advantageous to use one working chamber for blowing air into the exhaust pipe of the primary engine for the purpose of post-combustion to reduce the noxious components of exhaust gas. Additional porting and outlet channels for such air can be provided as required.

The supercharger may have its own induction channel through which air may be indrawn directly from the atmosphere. However, it is also possible to use the transfer channel which communicates with the primary engine as a suction channel also for the supercharger, so that the supercharger draws its air from a chamber of the primary engine which is in the induction phase. Analogously, the exhaust of the expansion engine may be discharged to atmosphere through its own exhaust port, or back through a transfer channel into an operating chamber of the primary engine while it is in its exhaust phase, and thus through the exhaust port of the primary engine. By means of such double functioning of intake and exhaust channels, there can be avoided the multiplication of individual intake and exhaust lines with their associated installation arrangements.

When there is coupled to the main shaft an epitrochoidal device having two working chambers, operating processes independent of one another can be carried out in its two chambers. For example, each working chamber can be used to supply the primary engine with supplementary air, or for post-expansion from the primary engine. It is also possible to use one working chamber for the compression of supplementary air, and the other chamber for post-expansion. Alternatively, one chamber may be used for either of the two functions already mentioned, and the other for pumping air into the exhaust pipe of the primary engine.

In such a case, a very simple control for gas-exchange may be provided when in each end wall of the rotary piston secondary engine there is disposed a recess having an outer contour corresponding generally to the inner envelope curve of the rotor, each of these recesses being in communication with the appropriate gas-transfer channel. One end face of the rotor is beveled off along the edge of one working face, and the other end face is beveled off along the edge of the opposite working face. Thus, one of the two chambers is always in communication with one recess, and the other chamber is always in communication with the other recess. Rather than the bevels indicated, it is also possible to provide any other desired communicating passage between each working face and the relevant end face.

The invention will be readily understood on reading the following specification in connection with the accompanying drawings, in which—

FIG. 5 is a diagram similar to FIG. 1, showing the volumetric variations of a primary rotary engine and a secondary engine;

FIG. 6 is a semischematic showing of a primary rotary engine coupled to a reciprocating piston supercharger and a reciprocating expansion engine.

Figure 1:
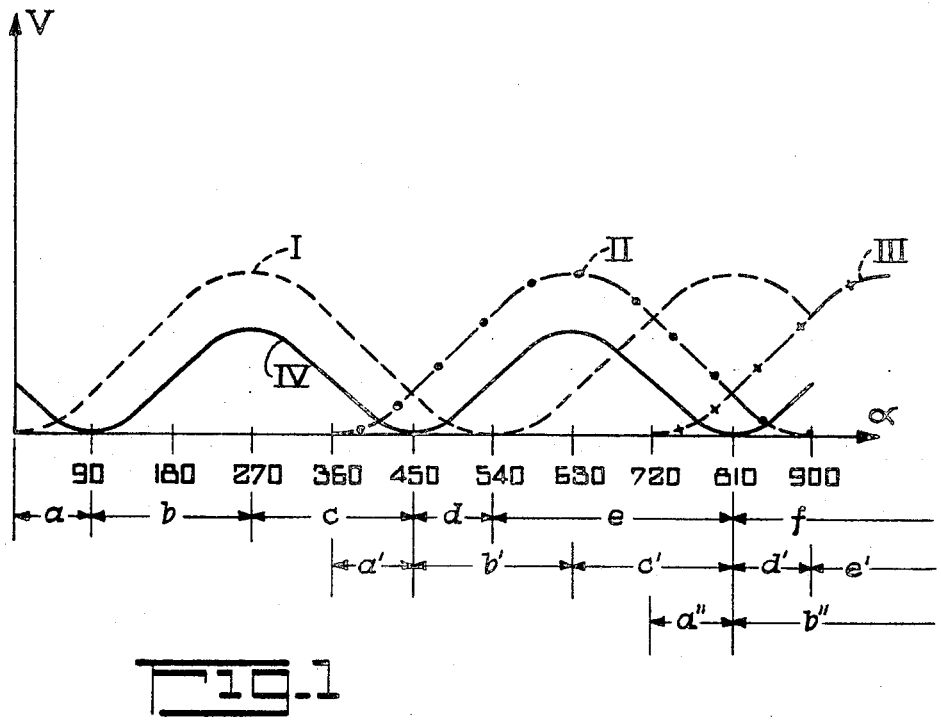
FIG. 1 is a diagram of the volumetric variations of the rotary engine and the supercharger, relative to the angle of rotation of the main shaft.

Reference is first made to FIG. 1, which shows the volumetric variation of the working chambers of the rotary internal combustion engine and the volumetric variation of the working chamber of a supercharger which makes one induction and one compression stroke during a 360° revolution of the main engine shaft. This supercharger may be either a reciprocating piston such as that shown in FIG. 2, or a rotary piston device such as that shown in FIG. 3.

In the case of a primary rotary engine having a two-lobed epitrochoid, each working phase or stroke extends over 270° of revolution of the main shaft. The phase displacement between successive working chambers amounts to 360°. Corresponding to this, in the diagram of FIG. 1 the induction process for chamber I (dotted line) of the primary engine extends from 0° to 270°, and compression occurs from 270° to 540°. Chamber II (dot-dash line) intakes from 360° to 630°, and compresses from 630° to 900°.

The volumetric variation of the displacement supercharger, in which the induction cycle and the compression cycle each extend over 180° of main shaft revolution, is represented by the solid line IV. The drive shaft of the displacement supercharger is coupled to the main drive shaft of the primary engine in such a way that the supercharger begins its induction cycle at 90° and ends it at 270°. The compression cycle of the supercharger occurs from 270° to 450°; the next induction cycle follows from 450° to 630°, and the next compression cycle from 630° to 810°.

The pattern of operation is as follows. For the distance $a$ only chamber I of the combustion engine inducts. During distance $b$ induction occurs in both chamber I and in supercharger IV. Over distance $c$ compression takes place in both chamber I and supercharger IV, with simultaneous forcing of the air charge in the supercharger through the transfer channel into chamber I. At the end of distance $c$, which is the end of the compression cycle of supercharger IV, the communication between the supercharger and chamber I is closed, and the charge previously sucked in by chamber I itself, as well as the supplementary charge forced in along distance $c$, is now compressed in chamber I along distance $d$ to the necessary value.

Near the end of distance $d$ the fuel is injected, and combustion and expansion occur in chamber I over distance $e$, following which the exhaust cycle takes place over the incompletely shown distance $f$; this sequence is then followed by a succeeding distance $a$.

Parallel with the foregoing, chamber II of the rotary engine inducts by itself along distance $a'$. Along distance $b'$, which begins at the end of distance $c$, induction occurs in chamber II and simultaneously in supercharger IV through chamber II. For the distance $c'$ compression occurs in both chambers, with simultaneous transfer of air through the communicating channel from supercharger IV into chamber II. This transfer terminates at the end of distance $c'$, and for the distance $d'$ the total charge is then compressed in chamber II. Meanwhile, working chamber III of the engine begins its induction cycle at 720°, at the start of distance $a''$. At 810° the supercharger IV also begins induction, and the sequence of operation already described for chambers I and II is repeated.

The chamber volume of the supercharger will ordinarily be approximately equal to the chamber volume of the combustion engine, thereby approximately doubling the quantity of air compressed in the engine, which will result in sufficient pressure for the diesel process. If greater supercharging is desired, the chamber volume of the supercharger is made correspondingly larger.

Figure 2:
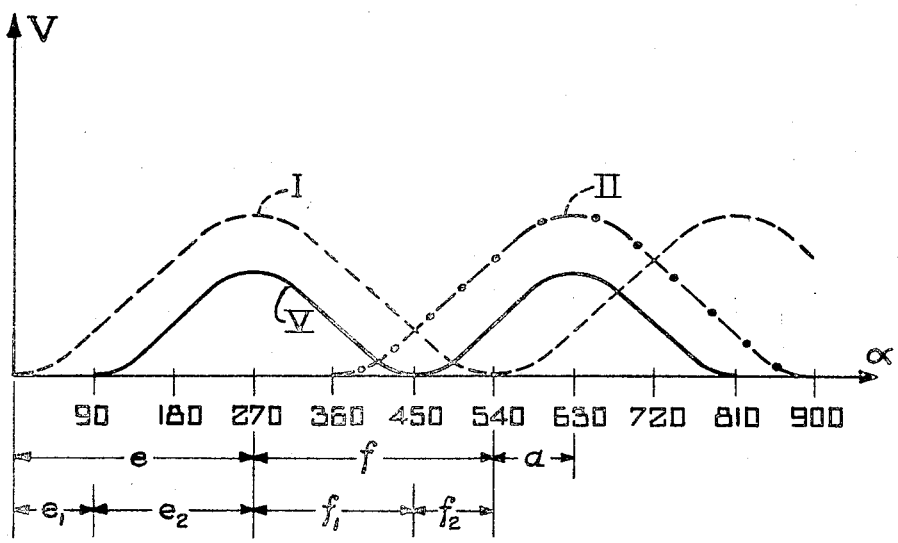
FIG. 2 shows a semischematic representation of an epitrochoidal rotary engine coupled with a reciprocating piston supercharger.

An embodiment of the combination operating in accordance with the diagram of FIG. 1 is shown in FIG. 2. Numeral 1 designates generally a rotary combustion engine of known type of construction, shown in cross-section transverse to the longitudinal axis. The center housing shell 2 of the engine has a peripheral inner surface 3 having the profile of a two-lobed epitrochoid. The engine shaft 4 is rotatably mounted coaxially with the peripheral housing, and bears an eccentric portion 5 on which is rotatably mounted a rotor 6 of the generally triangular profile associated with a two-lobed epitrochoidal engine. The rotational speed of the rotor 6 is in a 1:3 ratio to the rotational speed of the shaft 4. Various ancillary elements, such as apex seals, end-face gas seals, oil seals, bearings, etc., form no part of the present invention and are omitted from the drawings for simplification.

The housing 2 is provided with a peripherally disposed inlet channel 7, an injection nozzle 8, and a peripheral outlet channel 9. During rotation of the rotor 6 in the direction shown by the arrow D, working chambers I, II, and III vary in volume, whereby during each complete rotation of the rotor there occurs in each working chamber one complete four-cycle process of induction, compression, combustion and expansion, and exhaust. In the position shown in FIG. 2, chamber I is at the end of its induction cycle, in chamber III the expansion cycle is proceeding, and in chamber II the exhaust cycle is taking place.

A reciprocating piston supercharger is indicated generally at 11. In practice such a supercharger might be coaxial with the engine, or only slightly displaced with the shafts of the two devices coupled in a 1:1 ratio. However, for the purpose of greater clarity in the drawings, the supercharger is shown with its axis parallel to the axis of the engine and considerably displaced therefrom. The dashed line C indicates coupling of the main shaft 4 of the engine with the shaft 10 of the supercharger, either by reason of the two machines having a common shaft or by gear coupling in a 1:1 ratio.

Supercharger 11 has a cylinder 12, with a reciprocating piston 13 disposed therein. Piston 13 is linked by a connecting rod 14 to a crankpin 15 mounted on shaft 10. Transfer passage mean 16 communicates with the interior of cylinder 12 in the dome region, and successively with the working chambers of the engine by means of a control port 17 disposed in one of the end walls 18 of the engine. If desired, a pair of oppositely disposed ports 17 may be provided, one in each end wall, and the passage 16 forked to communicate with both ports.

As shown in FIG. 2, piston 13 of the supercharger is positioned at its lower dead center, that is, it has just completed its induction cycle. Supercharger induction takes place through intake port 7 of the engine, working chamber I, control port 17, and conduit 16. The illustrated position of reciprocating piston 13 and of rotor 6 corresponds to the 270° angular position of the diagram of FIG. 1; therefore, chamber I as shown in FIG. 2 has also just completed its induction cycle, and there is a full charge of air in chamber I and an equal or greater supplementary charge in the supercharger.

During further turning of the main shaft 4, compression begins in chamber I as rotor 6 turns further in a clockwise direction, and simultaneously compression in cylinder 12 and tranfer of air begin as piston 13 begins its upward stroke. The air in cylinder 12 now travels back over the return path, through conduit 16 and control port 17 into chamber I, but since the rotor apex has now closed intake port 7 the charge is compressed into chamber I.

Figure 3:
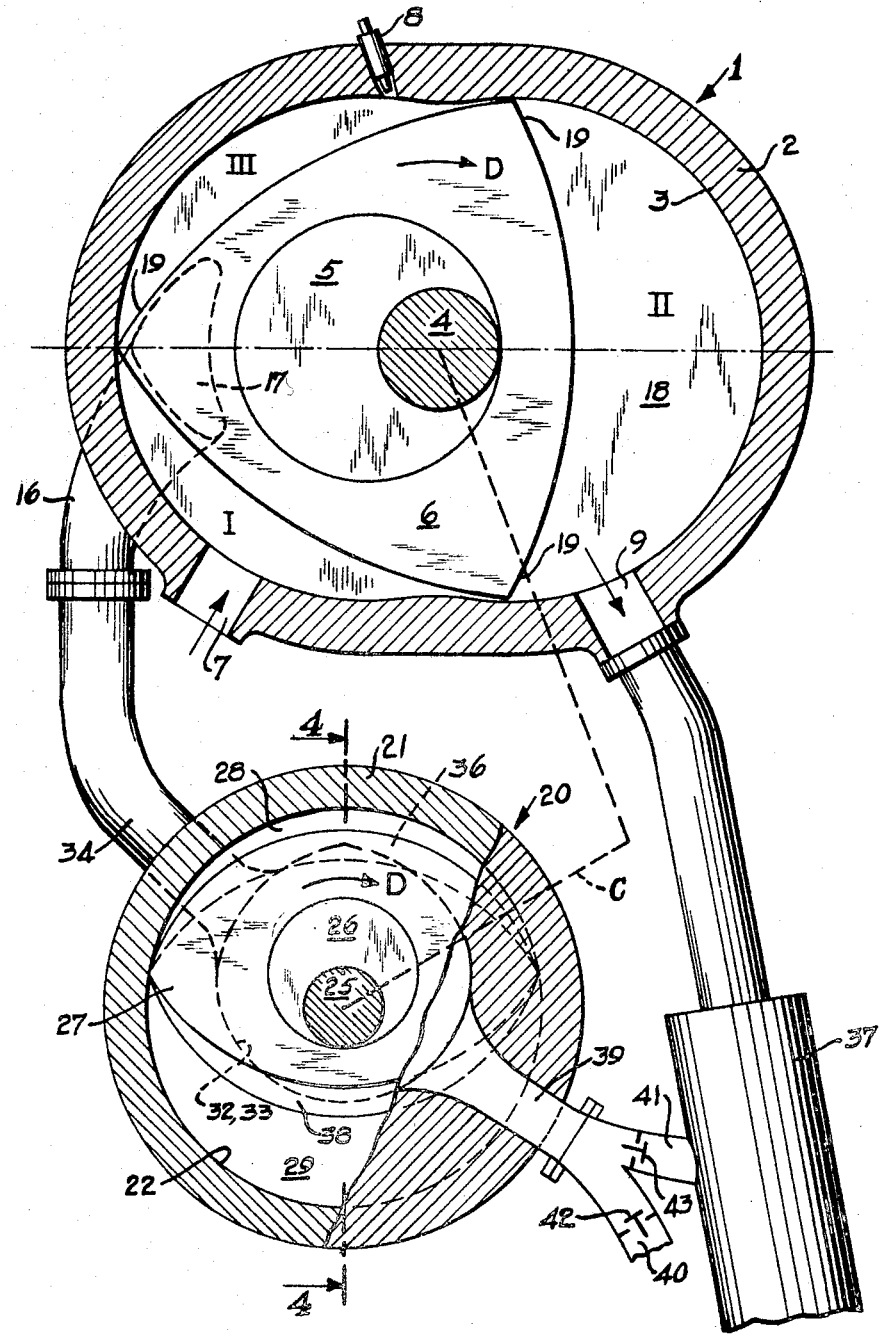
FIG. 3 is a semischematic representation of a two-lobed epitrochoidal engine coupled with a one-lobed rotary supercharger.

Control port 17 in one or both end walls is of generally triangular outline, having a shape approximately congruent to that of the apexes 19 of rotor 6, and is disposed on the major diameter of the epitrochoid with the apex of its triangle adjacent to the peripheral housing and with the major diameter bisecting its base. Therefore, 90° before rotor 6 reaches its upper dead center, that is, at the 450° position of FIG. 1, one of its apexes 19 lies exactly over port 17, closing it off from the supercharger (as shown in FIG. 3). At this time, transfer from the supercharger will cease, piston 13 reaching its uppermost position, and compression of the entire charge continues only in chamber I.

During further turning of shaft 4 and shaft 10, piston 13 again descends and control port 17 is again opened by rotor 6 for the next following chamber II, which has already begun its induction cycle. Piston 13 therefore inducts, in the manner previously described, through port 7, chamber II, port 17, and conduit 16 (distance $b'$ in FIG. 1). Meanwhile, chamber I has completed its compression cycle, whereupon fuel is injected at nozzle 8, ignition occurs, and the expansion and exhaust cycles proceed in the usual way.

Figure 4:
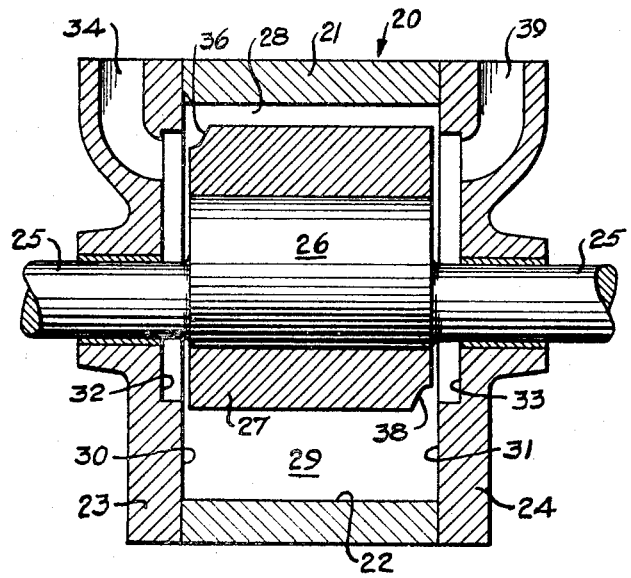
FIG. 4 shows a cross-section taken along line 4—4 of FIG. 3.

In the embodiment of FIGS. 3 and 4, there is shown the same rotary combustion engine 1 as in FIG. 2, but having its shaft 4 connected to the shaft 25 of a rotary displacement supercharger 20. The housing of the rotary supercharger comprises a peripheral shell 21 having an inner surface 22 in the form of a one-lobed epitrochoid, and end walls 23 and 24. The drive shaft 25 of the supercharger is coupled (shown schematically by dashed line C) to the engine shaft 4 in such a way, as by gearing, that it turns at double the speed of shaft 4. Shaft 25 is provided with an eccentric portion 26 on which is rotatably mounted a two-apexed rotor 27, with its apexes sweeping the inner peripheral surface 22. The rotational speed of rotor 27 is therefore in a 1:2 ratio with the speed of its shaft 25.

With such an arrangement, there are formed between the rotor 27 and the housing two working chambers 28 and 29, which periodically vary in volume during rotation of rotor 27. The inner surfaces 30 and 31 of end walls 23 and 24 are each provided with a recess, 32 and 33, of which the outer contours correspond in shape to the inner envelope curve of rotor 27. Recess 32 in end wall 23 is connected by passage means 34 and 16 with control port 17. Permanent communication between working chamber 28 and recess 32 is obtained by providing rotor 27 with a bevel or other suitable relief 36 along one edge bounded by the two apexes, the working face of chamber 28, and the end face of the rotor adjacent to recess 32. There is no communication between chamber 28 and the opposite recess 33.

The positions of engine rotor 6 and supercharger rotor 27 as shown in FIG. 3 correspond to the 90° angular position of FIG. 1. Chamber I has therefore already begun its induction cycle, while rotor 27 is at its upper dead center at the beginning of its induction cycle. After the shafts 4 and 25 have turned a few degrees, control port 17 of chamber I becomes uncovered, and induction will begin in chamber 28 while continuing in chamber I. During further rotation the operative process proceeds as has been explained in connection with FIGS. 1 and 2.

With this example of construction, working chamber 29 is used for the purpose of feeding air into the exhaust equipment 37 of the rotary combustion engine. Chamber 29 of the supercharger is in permanent communication with recess 33 by means of a bevel or relief 38 analogous to relief 36, but in the opposite position, that is, bounded by the two apexes, the working face of chamber 29, and the end face of the rotor adjacent to recess 33. From recess 33 runs passage means 39, which forks into an induction channel 40 to atmosphere and an air-feed passage 41 communicating with engine exhaust 37. In the induction channel 40 is disposed a suction valve 42, and in the air-feed line 41 is disposed a pressure or exhaust valve 43. In the phase illustrated, chamber 29 is at its maximum volume and therefore at the end of its induction cycle. With further turning of rotor 27, compression occurs in chamber 29, whereby valve 42 is closed and valve 43 opens, and air is blown into exhaust equipment 37 for after-burning purposes.

With a rotary supercharger 20 such as shown, connection to the engine can be so made as to provide one intake and compression cycle of the supercharger for each working chamber of the engine, as well as one intake and discharge cycle of after-burning air to the exhaust equipment for each rotation of the rotor of the supercharger.

In the phase diagram of FIG. 1, which is based on the operation of the embodiments shown in FIGS. 2 and 3, the compression cycles of the engine and of the supercharger begin at the same time. However, it may be advantageous for the compression cycle of the supercharger to begin, for example, 30° before the compression cycle of the engine, in order that the pressure in the working chamber of the engine may be less during transfer, decreasing throttling losses.

Because the coupling of a supercharger driven only by the engine shaft decreases the overall efficiency of the machine, it is advantageous to provide post-expansion for the purpose of at least meeting the power requirement of the supercharger. Analogously to the arrangement of the supercharger, therefore, there may be coupled to the main shaft of the primary engine an expansion engine. The expansion chamber of this secondary engine is in communication, by means of transfer passage means, with the working chamber of the primary engine which is in its expansion phase. In this case also, the expansion engine performs one cycle for each 180° of rotation of the primary engine shaft.

The expansion cycle of the primary engine should begin before the beginning of the expansion cycle of the coupled secondary engine. The diagram of FIG. 5 shows how such a combination operates. Chamber I of the primary engine is here expanding from combustion gases for the distance $e$. This distance is divided into the lengths $e_1$ and $e_2$, with combustion gas expanding only in chamber I during the distance $e_1$. At 90° the chamber V of the secondary, expansion-type engine comes into communication with chamber I, so that during the distance $e_2$ both machines are expanding at the same time. The distance $f$ is likewise divided into lengths $f_1$ and $f_2$, and during the distance $f_1$ both devices exhaust at the same time, while during $f_2$ only chamber I of the primary engine continues to exhaust. At the end of distance $f_1$ the expansion engine completes its exhaust cycle and once more begins to increase in volume, in that it is receiving its expansion gas from the next following chamber II. The chamber volume of the expansion engine should be at least equal to the chamber volume of the associated supercharger.

An embodiment of such a combination of primary rotary engine, secondary engine, and supercharger is shown in FIG. 6. The supercharger portion of the combination corresponds to that shown in FIG. 2. An expansion engine 46 of the reciprocating piston type has its crankshaft 45 coupled in direct ratio to the main shaft 4 of the primary engine. The secondary engine has a cylinder 47 in which is disposed a piston 48, connected by a connecting rod 49 to the crankpin 50 borne by the crankshaft. Cylinder 47 is in communication by passage means 51 with a control port 52 in one or both end walls of the housing of the rotary engine 1. Control port 52 is analogous to the previously described port 17, being of generally triangular outline with a shape approximately congruent to that of the apexes 19 of rotor 6, and disposed on the major diameter of the epitrochoid with the apex of its triangle adjacent to the peripheral housing and with the major diameter bisecting its base. It will be seen that control port 52 is thus similar to port 17, but located at the opposite end of the major diameter, in the expansion and exhaust portion of the rotary engine, and that the rotor 6 will overrun port 52 to open and close it in exactly the same way as previously described for the intake and compression portion of the engine.

As shown in FIG. 6, piston 48 of the secondary engine is at its upper dead center, that is, it has just ended its exhaust cycle. In the diagram of FIG. 5, this piston corresponds to the 90° angular position. During further turning of shafts 4 and 45 in the direction of rotation shown by the arrows D, piston 48 will move downward and control port 52 of the expanding chamber I is uncovered. Expanding gases then pass through port 52 and conduit 51 into cylinder 47, further expanding there and applying power to piston 48. When piston 48 reaches its lower dead center, exhaust channel 9 of the primary engine will be opened to chamber I by reason of the rotor apex having passed it, and there begins a common exhaust which corresponds to distance $f_1$ of FIG. 5, until piston 48 again reaches its upper dead center as shown in FIG. 6, whereupon the following chamber II will begin transferring expansion gases to the secondary engine while chamber I completes its exhaust cycle, corresponding to distance $f_2$ of FIG. 5.

The power realized by post-expansion in the secondary engine is put back into the main shaft 4 by reason of the couple, and is sufficient to drive the supercharger. The supercharger itself may be coupled directly to the main shaft, or may be coupled only to the secondary engine, as desired, it being only necessary that the supercharger and the secondary engine be phased 180° apart.

A supercharger and an expansion engine for driving it can also be combined into a single machine. Especially advantageous for this is a one-lobed epitrochoidal device connected to the main shaft in such a way that it turns at double the speed of shaft 4. Such a device, similar to the supercharger shown in FIG. 3, has two operative chambers, one of which can be used for precompression and the other for post-expansion.

Figure 7:
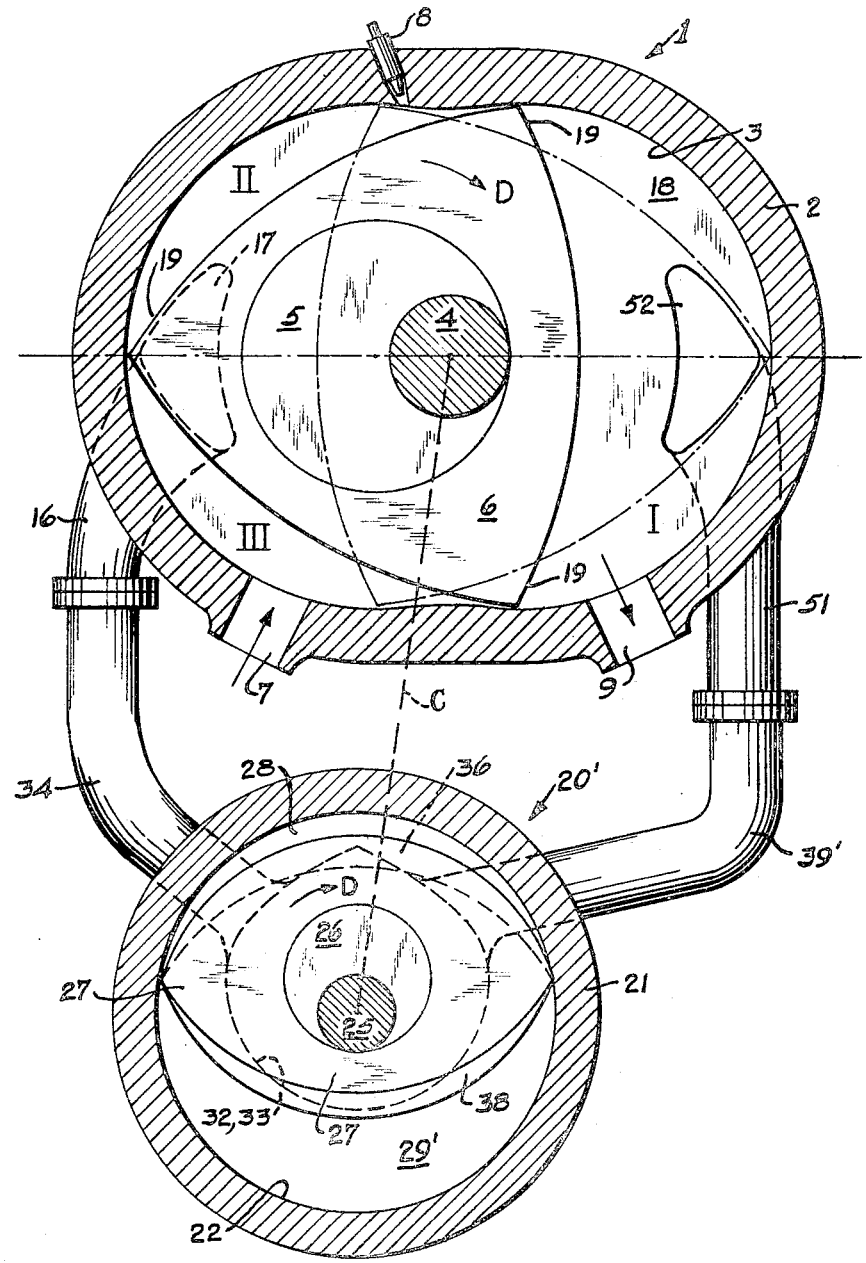
FIG. 7 is a semischematic representation of a primary rotary engine coupled to secondary rotary expansion engine and supercharger combined in a single unit.

Such a form of construction is shown in FIG. 7. The rotary device 20' corresponds in its design entirely with that of machine 20 of FIGS. 3 and 4. However, whereas in FIG. 3 the working chamber 29 is used to pump air to the exhaust pipe of the primary engine, in FIG. 7 this chamber 29' is used as an expansion chamber. For this purpose, conduit 39' from recess 33 in the end wall communicates with pipe 51 which leads from the control port 52. Rotor 6 of the primary rotary engine 1 is shown in the same phase position as in FIG. 3, but with the working chambers differently designated for reference to other functions.

As shown in FIG. 7, chamber I is just beginning its exhaust cycle, and therefore is at the 270° angular position with respect to the diagram of FIG. 5. Chamber 29', containing fully expanded combustion gas, is likewise at the instant of its maximum volume, and begins to exhaust through conduits 39' and 51, control port 52, working chamber I, and exhaust channel 9. When the rotor 6 arrives at the position shown by the dashed lines, which corresponds to the 450° angular position of FIG. 5, then chamber 29' will have ended its exhaust cycle and port 52 will be closed off by the rotor apex from chamber I. After further turning, control port 52 comes into communication with chamber II, which will then be in its expansion cycle, so that expansion gases then again pass into chamber 29' which is then becoming enlarged again.

According to the diagram of FIG. 5, and the embodiments shown in FIGS. 6 and 7, the expansion cycles of the primary rotary engine and the secondary expansion engine end at the same time. However, it may be advantageous to couple the two machines together in such a way that the expansion stroke of the secondary engine ends later, for example 30°, after the end of expansion in the primary engine. Consequently, the return flow of exhaust gas from the secondary engine begins later, which is advantageous because the pressure and temperature in the associated exhausting chamber of the primary engine will be lower, so that throttling losses are diminished.

With all the examples of construction illustrated, for the purpose of greater clarity the devices coupled to the primary rotary engine have been shown with parallel axes. In practice the machines are disposed coaxially with the primary engine, or with only the amount of displacement necessary for any relevant gearing, and the various transfer passages means may be disposed in the wall members of the machines, for the purpose of keeping flow paths short and preventing flow resistance.

Although the invention has been described above with reference to specific embodiments, it will be understood by those skilled in the art that various modifications may be made without departing from the scope of the invention. It is intended to cover all such modifications in the appended claims.

What is claimed is:

1. A four-cycle rotary internal combustion engine of epitrochoidal type, comprising in combination a housing having a peripheral housing member having a two-lobed epitrochoidal inner surface and a pair of parallel end walls spaced apart thereby and defining an internal cavity having an intake and compression lobe and an expansion and exhaust lobe, a first shaft transpiercing said end walls and having an eccentric portion within said cavity, a generally triangular rotor having a three apex portions rotatably mounted on said eccentric with its apexes sweeping said inner surface in sealing relation thereto and forming with said housing three variable volume working chambers, said peripheral housing member having an intake port in said intake and compression lobe and an exhaust port in said expansion and exhaust lobe, at least one of said end walls having an induction gas transfer port therein in the intake and compression lobe, at least one fluid machine including a supercharger disposed adjacent to said engine, said supercharger having at least one working chamber and piston means disposed therein and a second shaft operatively connected to said piston means, said first and second shafts being coupled together, and induction passage means communicating between said induction gas transfer port and said supercharger working chamber to transfer induction gas between said rotary engine and said supercharger during operating cycles thereof, said supercharger working chamber intaking induction gas through said induction passage means from said intake and compression lobe during the time said intake port is open and compressing the induction gas back into said intake and compression lobe after said intake port has closed.

2. The combination recited in claim 1, wherein the compression cycle of said supercharger ends before the ending of the compression cycle of said rotary engine.

3. The combination recited in claim 1, wherein during rotation of said rotary engine shaft the intake cycle of said supercharger begins 90° after the beginning of the intake cycle of said rotary engine, and the compression cycle of said supercharger ends 90° before the end of the compression cycle of said rotary engine.

4. The combination recited in claim 1, wherein said supercharger has a cylinder having a reciprocating piston disposed therein and forming said supercharger working chamber therewith, and said supercharger shaft turns at the same rotational speed as said shaft of said rotary engine.

5. The combination recited in claim 1, wherein said supercharger comprises a rotary piston fluid machine having a one-lobed epitrochoidal cavity and a two-apexed rotor disposed therein, and said supercharger shaft turns at twice the rotational speed of said engine shaft.

6. The combination recited in claim 1, wherein a combustion gas transfer port is disposed in said expansion and exhaust lobe and is in communication with a working chamber of said rotary engine during at least a portion of the expansion cycle of said chamber and during at least a portion of the exhaust cycle of said chamber, and said fluid machine includes an expansion engine having combustion gas passage means communicating with said combustion gas transfer port, said expansion engine performing one expansion cycle and one exhaust cycle through said combustion gas passage means and through said combustion gas transfer port during the time said combustion gas transfer port is open to said rotary engine working chamber.

7. The combination recited in claim 6, wherein during rotation of said rotary engine shaft the expansion cycle of said expansion engine begins 90° after the beginning of the expansion cycle of said rotary engine, and the exhaust cycle of said expansion engine ends 90° before the end of the exhaust cycle of said rotary engine.

8. The combination recited in claim 6, wherein said expansion engine has a cylinder having a reciprocating piston disposed therein and forming said expansion engine working chamber therewith, and said expansion engine shaft turns at the same rotational speed as said shaft of said rotary engine.

9. The combination recited in claim 6, wherein said expansion engine comprises a rotary piston fluid machine having a one-lobed epitrochoidal cavity and a two-apexed rotor disposed therein, and said expansion engine shaft turns at twice the rotational speed of said rotary engine shaft.

10. The combination recited in claim 6, wherein said supercharger and said expansion engine are a single fluid machine unit, comprising in combination a housing having a peripheral housing member having a one-lobed epitrochoidal inner surface and first and second parallel end walls spaced apart thereby and defining an internal cavity, a shaft coupled to said rotary engine shaft and transpiercing said end walls and having an eccentric portion within said cavity, a two-apexed rotor rotatably mounted on said eccentric portion within said cavity with its apexes sweeping said one-lobed inner surface in sealing relation therewith and forming with said housing a supercharger working chamber and an expansion engine working chamber, said first end wall having in its inner surface a recess in communication with said supercharger working chamber, passage means communicating between said first end wall recess and said first transfer port for transfer of induction gas therethrough, said second end wall having in its inner surface a recess in communication with said expansion engine working chamber, passage means communicating between said second end wall recess and said second transfer port for transfer of combustion gas therethrough, said fluid machine shaft turning at twice the rotational speed of said rotary engine shaft.

11. The combination recited in claim 10, wherein the compression cycle of said supercharger working chamber ends before the end of the compression cycle of said first rotary engine working chamber, and the exhaust cycle of said expansion engine working chamber ends before the end of the exhaust cycle of said second rotary engine working chamber.

12. The combination recited in claim 10, wherein during rotation of said rotary engine shaft the intake cycle of said supercharger working chamber begins 90° after the beginning of the intake cycle of said first rotary engine working chamber and the compression cycle of said supercharger working chamber ends 90° before the end of the compression cycle of said first rotary engine working chamber, and wherein the expansion cycle of said expansion engine working chamber begins 90° after the beginning of the expansion cycle of said second rotary engine working chamber and the exhaust cycle of said expansion engine working chamber ends 90° before the end of the exhaust cycle of said second rotary engine working chamber.

13. A rotary fluid machine, comprising in combination a housing having a peripheral housing member having a one-lobed epitrochoidal inner surface and first and second parallel end walls spaced apart thereby and defining an internal cavity therein, a shaft transpiercing said end walls and having an eccentric portion within said cavity, a two-apexed rotor rotatably mounted on said eccentric portion within said cavity with its apexes sweeping said one-lobed inner surface in sealing relation therewith, said rotor having first and second end faces respectively abutting said first and second end walls, the peripheral surface of said rotor comprising first and second working faces extending between said apexes, said first and second working faces defining with said housing respectively first and second variable volume non-communicating working chambers, said first end wall having in its inner surface a recess covered by said first rotor end face, said rotor having its first end face beveled along at least a portion of the corner thereof adjoining said first working face providing continuous communication between said first working chamber and said first end wall recess, said second end wall having in its inner surface a recess covered by said second rotor end face, said rotor having its second end face beveled along at least a portion of the corner thereof adjoining said second working face providing continuous communication between said second working chamber and said second end wall recess, said housing having first passage means therethrough communicating with said first end wall recess and second passage means therethrough communicating with said second end wall recess.

14. The combination recited in claim 1, wherein said fluid machine is a rotary fluid machine comprising in combination a housing having a peripheral housing member having a one-lobed epitrochoidal inner surface and first and second parallel end walls spaced apart thereby and defining an internal cavity therein, a second shaft transpiercing said fluid machine end walls and having an eccentric portion within said cavity, a two-apexed rotor rotatably mounted on said eccentric portion with its apexes sweeping said one-lobed inner surface in sealing relation therewith, said fluid machine rotor having first and second end faces respectively abutting said first and second fluid machine end walls, the peripheral surface of said fluid machine rotor comprising first and second working faces extending between said apexes, said first and second working faces defining with said housing respectively first and second variable volume non-communicating working chambers, said first fluid machine end wall having in its inner surface a recess covered by said first rotor end face, said rotor having its first end face beveled along at least a portion of the corner thereof adjoining said first working face providing continuous communication between said first working chamber and said first end wall recess, said second fluid machine end wall having in its inner surface a recess covered by said second rotor end face, said rotor having its second end face beveled along at least a portion of the corner thereof adjoining said second working face providing continuous communication between said second working chamber and said second end wall recess; said induction gas transfer port being disposed in the rotary egine intake and compression lobe, and said induction transfer passage means communicating between said induction gas transfer port and said first end wall recess; said rotary engine having exhaust means extending from said exhaust port; said fluid machine housing having passage means communicating with said second end wall recess which passage means has an intake port open to air during the induction cycle of said second working chamber and a discharge port communicating with said engine exhaust means during the discharge cycle of said second working chamber, whereby said first fluid machine working chamber supercharges said rotary engine and said second fluid machine working chamber discharges air into said exhaust means.

15. The combination recited in claim 1, wherein in said fluid machine is a rotary fluid machine comprising in combination a housing having a peripheral housing member having a one-lobed epitorchoidal inner surface and first and second parallel end walls spaced apart thereby and defining an internal cavity therein, a second shaft transpiercing said fluid machine end walls and having an eccentric portion within said cavity, a two-apexed rotor rotatably mounted on said eccentric portion with its apexes sweeping said one-lobed inner surface in sealing relation therewith, said fluid machine rotor having first and second end faces respectively abutting said first and second fluid machine end walls, the peripheral surface of said fluid machine rotor comprising first and second working faces extending between said apexes, said first and second working faces defining with said housing respectively first and second variable volume non-communicating working chambers, said first fluid machine end wall having in its inner surface a recess covered by said first rotor end face, said rotor having its first end face beveled along at least a portion of the corner thereof adjoining said first working face providing continuous communication between said first working chamber and said first end wall recess, said second fluid machine end wall having in its inner surface a recess covered by said second rotor end face, said rotor having its second end face beveled along at least a portion of the corner thereof adjoining said second working face providing continuous communication between said second working chamber and said second end wall recess; a combustion gas transfer port being disposed in the rotary engine expansion and exhaust lobe, combustion transfer passage means communicating between said combustion gas transfer port and said first end wall recess; said rotary engine having exhaust means extending from said exhaust port, said fluid machine housing having passage means communicating with said second end wall recess which passage means has an intake port open to air during the induction cycle of said second working chamber and discharge port communicating with said engine exhaust means during the discharge cycle of said second working chamber, whereby said first fluid machine working chamber comprises an expansion engine driven by combustion gases from said rotary engine and said second fluid machine working chamber discharges air into said exhaust means.

16. The combination recited in claim 1, wherein said fluid machine is a rotary fluid machine comprising in combination a housing having a peripheral housing member having a one-lobed epitrochoidal inner surface and first and second parallel end walls spaced apart thereby and defining an internal cavity therein, a second shaft transpiercing said fluid machine end walls and having an eccentric portion within said cavity, a two-apexed rotor rotatably mounted on said eccentric portion with its apexes sweeping said one-lobed inner surface in sealing relation therewith, said fluid machine rotor having first and second end faces respectively abutting said first and second fluid machine end walls, the peripheral surface of said fluid machine rotor comprising first and second working faces extending between said apexes, said first and second working faces defining with said housing respectively first and second variable volume non-communicating working chambers, said first fluid machine end wall having in its inner surface a recess covered by said first rotor end face, said rotor having its first end face beveled along at least a portion of the corner thereof adjoining said first working face providing continuous communication between said first working chamber and said first end wall recess, said second fluid machine end wall having in its inner surface a recess covered by said second rotor end face, said rotor having its second end face beveled along at least a portion of the corner thereof adjoining said second working face providing continuous communication between said second working chamber and said second end wall recess; an induction gas transfer port being disposed in the rotary engine intake and compression lobe, and induction transfer passage means communicating between said induction gas transfer port and said first end wall recess; a combustion gas transfer port being disposed in the rotary engine expansion and exhaust lobe, and combustion passage means communicating between said combustion gas transfer port and said second end wall recess; whereby said first fluid machine working chamber comprises a supercharger for said rotary engine, and said second fluid machine working chamber comprises an expansion engine driven by combustion gases from said rotary engine.

References Cited
UNITED STATES PATENTS 3,228,183  1/1966  Feller _____ 123—8 X
3,259,113  7/1966  Hamada _____ 123—8

RALPH D. BLAKESLEE, *Primary Examiner.*